United States Patent [19]
Coretta et al.

[11] Patent Number: 5,411,626
[45] Date of Patent: May 2, 1995

[54] PLANT FOR MAKING TIRE CARCASSES FOR VEHICLE WHEELS

[75] Inventors: Renato Coretta, Gallarate; Bruno Colombani, Milan, both of Italy

[73] Assignee: Pirelli Coordinamento Pneumatici S.p.A., Milan, Italy

[21] Appl. No.: 15,155

[22] Filed: Feb. 11, 1993

[30] Foreign Application Priority Data

Feb. 11, 1992 [IT] Italy .................. MI92A0269

[51] Int. Cl.⁶ .................................. B29D 30/08
[52] U.S. Cl. .................. 156/396; 156/405.1; 156/406
[58] Field of Search ............ 156/396, 405.1, 406, 156/111; 29/782, 783, 791, 820, 823, 824

[56] References Cited

U.S. PATENT DOCUMENTS

| | | | |
|---|---|---|---|
| 2,365,341 | 12/1944 | Haren et al. | 156/406 |
| 3,157,542 | 11/1964 | Trevaskis | 156/396 X |
| 3,318,745 | 5/1967 | Black et al. | |
| 3,389,032 | 6/1968 | Black et al. | |
| 3,795,563 | 3/1974 | Enders et al. | 156/396 |
| 4,053,342 | 10/1977 | Appleby et al. | |
| 4,261,786 | 4/1981 | Martin et al. | 156/406 |
| 4,314,864 | 2/1982 | Loeffler et al. | 156/111 |
| 4,951,892 | 8/1990 | Chaplin et al. | 156/406 |
| 4,985,100 | 1/1991 | Sasaki et al. | 156/396 |

FOREIGN PATENT DOCUMENTS

| | | |
|---|---|---|
| 0004202 | 9/1979 | European Pat. Off. |
| 0067788 | 12/1982 | European Pat. Off. |
| 0246497 | 11/1987 | European Pat. Off. |
| 448407 | 9/1991 | European Pat. Off. |
| 2223988 | 4/1990 | United Kingdom |

Primary Examiner—Geoffrey L. Knable
Attorney, Agent, or Firm—Stevens, Davis, Miller & Mosher

[57] ABSTRACT

A plant for assembling elastomeric pneumatic tires having a plurality of assembling drums (2) moveable along a predetermined assembling path. Each drum encounters, according to a pre-established sequence, a number of primary work stations (10, 11, 12, 13) each intended for the application of a respective main component (4, 5, 6, 7) common to a plurality of carcass types included in a predetermined production range. Alongside the primary stations are auxiliary work stations (14, 15) intended for applying specifically provided accessory components (8, 9), each being designed for a particular carcass type. Each auxiliary station can be removed and replaced by a different station depending on the type of process to be carried out and is movable between a rest position in which it is perpendicularly moved away from the assembling path and a work position in which it is operatively disposed along the assembling path, in order to execute the application of the respective accessory component. The primary work stations (10, 11, 12, 13) can be moved close to and apart from each other along the assembling path.

7 Claims, 1 Drawing Sheet

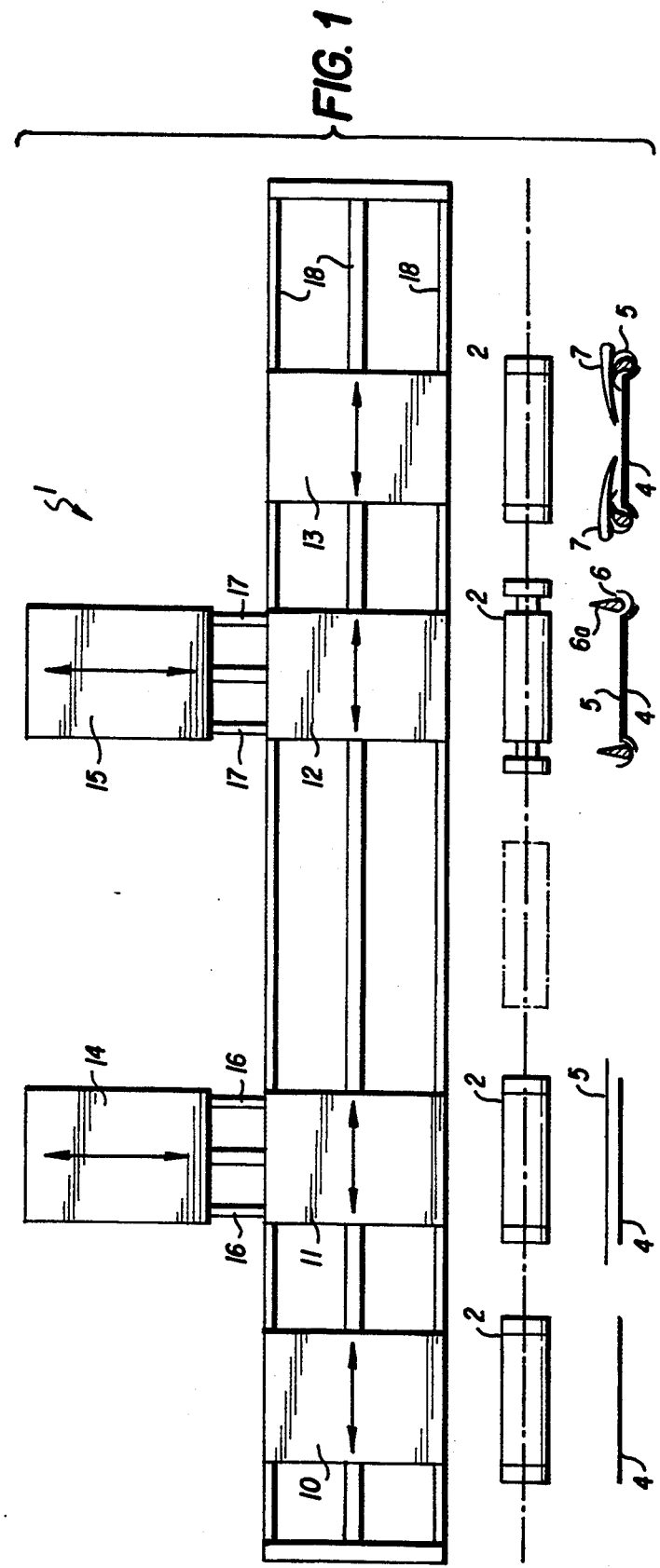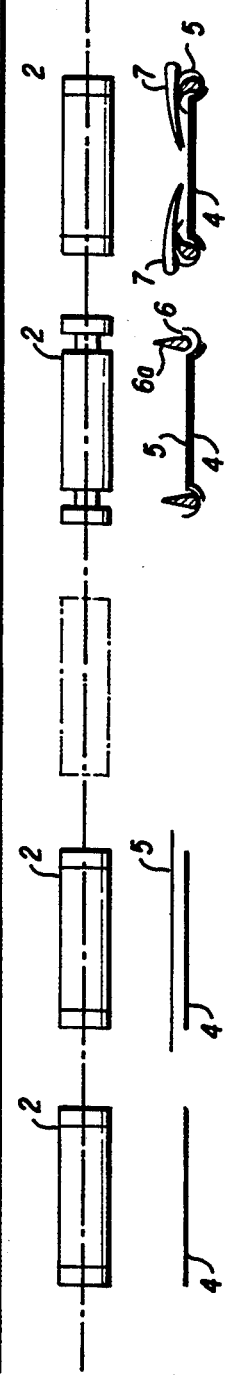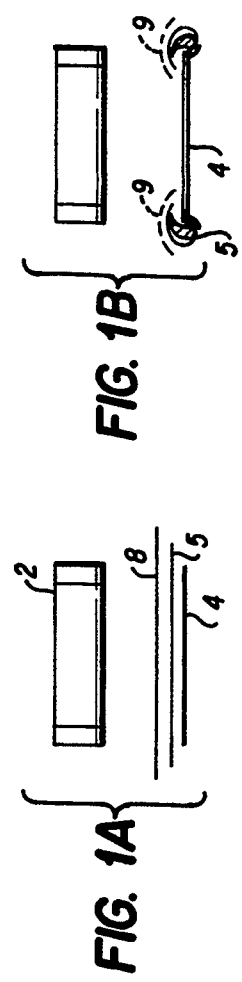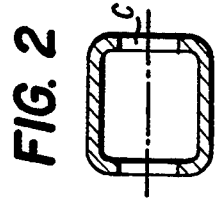

PLANT FOR MAKING TIRE CARCASSES FOR VEHICLE WHEELS

BACKGROUND OF THE INVENTION

The present invention relates to a plant for making tire carcasses for vehicle wheels, comprising a plurality of assembling drums capable of being moved along a predetermined assembling path; a plurality of primary work stations disposed consecutively in side by side relation along said assembling path and each designed to apply, around each individual assembling drum, a main component common to a plurality of carcass types included in a given production range. At least one auxiliary work station is disposed along said assembling path and designed to apply, around each individual assembling drum, at least a predetermined accessory component, intended for a specific one of said tire carcass types.

It is known that in making vehicle tires, for example for automobiles, the manufacture of a so-called carcass is first achieved by successively assembling several different components.

In this connection it is noted that generally the use of a given number of main components is provided which are common to all carcass types falling within a given production range. There are then accessory components each relating to a specific carcass type included in said range.

In other words, the different carcass types included in a production range can be distinguished from one another depending on the presence thereon of the various accessory components and/or the typology of the accessory components themselves.

By way of example, when carcasses for tubeless tires are to be produced, that is tires that in use do not require the presence of an inner tube, the main components can be considered to include a so-called "liner" that is a layer of elastomeric air-impervious material, a carcass ply, a pair of annular metal elements, commonly referred to as bead cores, around which the opposite ends of the carcass ply are folded, as well as a pair of side walls made of elastomeric material, extending over the carcass ply at laterally opposite positions. The accessory components may in turn comprise of one or more additional carcass plies, one or more reinforcing bands for overlying the carcass ply or plies at the areas turned up around the bead cores (chafer strips), and others.

In modern production processes the assembling of the different components is carried out in automated plants including a plurality of assembling drums moved following a precise working sequence in accordance with the manufacturing process to be executed. These plants consist of a plurality of work stations disposed consecutively in side by side relation, each of which lends itself to carry out the application of a predetermined component onto the assembling drums that in turn are brought in front of it.

In particular there are primary work stations intended for application of the main components, which are always active, irrespective of the carcass type being produced. Alternated with the various primary work stations there are one or more auxiliary work stations, intended for application of accessory components, if required. The activation or deactivation state of these auxiliary stations depends on the carcass type in progress of manufacture.

SUMMARY OF THE INVENTION

In accordance with the present invention it has been found that in order to achieve a very versatile plant offering excellent features of flexibility in use, simple setting up and productivity, the auxiliary work stations should conveniently be quickly replaced by other stations more suitable for the type of process required at the moment, being at the same time adapted to be moved away from the path along which the assembling drums move, when they are to be kept inactive. Said primary work stations too should be movable along the assembling path so as to be moved apart from, and close to each other in order to enable one or more auxiliary stations to be inserted therebetween or removed therefrom. Thus a great simplification in the plant setting up and servicing operations is achieved, along with a reduction in the time required for carrying out the working cycle of the plant when the auxiliary stations are to be held at rest, as well as a great simplification in the operations necessary to adapt the plant to the manufacture of different carcass types.

The present invention in one main aspect relates to a plant for making tire carcasses for vehicle wheels, comprising a plurality of assembling drums moved along an assembling path providing a number of stop positions, each intended for coinciding with a specific operating step of the carcass manufacturing process, characterized in that at least one auxiliary work station is movable between a rest position in which it is moved away from the assembling path, and a work position in which it is brought onto the assembling path and disposed in an operative condition at one of said stop positions, in order to carry out the application of one accessory component.

Preferably, the movement of the individual auxiliary work stations occurs following a secondary path which is generally perpendicular to said assembling path along which the auxiliary work stations operate preferably in alignment with the primary work stations, along a common work axis, advantageously the axis of rotation of the carcass being produced. The common work axis is preferably linear but may be curved or circular.

It is also provided that at least one of said primary stations may be alternately movable, parallel to the assembling path, between one operating position, at one of said drum stop positions, and a second position which is shifted along said common work axis in relation to said operating position by an amount not less than the axial width of at least one of the auxiliary work stations in order to enable said auxiliary work station to occupy the work position formerly occupied at said drum stop position by the primary work station which was moved axially aside.

The present invention in a further aspect provides: one primary work station arranged to apply one main component, an elastomeric sealing layer for example, around the individual assembling drums; a second primary work station arranged to apply a second main component, one carcass ply for example, around said elastomeric sealing layer; one auxiliary work station arranged to optionally apply a semifinished additional piece, a second carcass ply for example, around the main carcass ply; a third primary work station arranged to apply a third main component, i.e. to associate a pair of bead cores for example with the opposite edges of the carcass ply or plies; a second auxiliary work station arranged to apply a further semifinished additional piece, a pair of reinforcing bands for example, at laterally opposite positions onto said carcass ply or plies; and a fourth primary work station arranged to add another main component, i.e. to apply a pair of side pieces of elastomeric material for example onto said carcass ply or plies, at laterally opposite positions.

Advantageously, each of said primary work stations is movable parallel to the assembling path, between one operating position at one stop position of said drums and a second position in which it is moved away from the preceding position by substantially the same measure as the positioning pitch of said drum stop positions.

BRIEF DESCRIPTION OF THE DRAWINGS

Further features and advantages will become more apparent from the detailed description of a preferred embodiment of a plant for making tire carcasses for vehicle wheels in accordance with the invention, given hereinafter by way of non-limiting example with reference to the accompanying drawings, in which:

FIG. 1 is a diagrammatic plan view of a plant for producing carcasses in accordance with the invention, also showing the working steps in succession carried out in the various work stations;

FIG. 1A is a diagrammatic view of a first auxiliary work station;

FIG. 1B is a diagrammatic view of a second auxiliary work station; and

FIG. 2 is a diagrammatic view of one of said assembled carcasses as viewed in section.

DETAILED DESCRIPTION OF A PREFERRED EMBODIMENT

Referring particularly to FIG. 1, a plant for producing tire carcasses for vehicle wheels in accordance with the present invention has been generally identified by reference numeral 1.

Plant 1 is intended for making a given range of carcass types, in particular carcasses for tires of the type commonly referred to as tubeless, that is to be used without an inner tube. Said tire production range is comprised of all tires of different types and sizes that can be made on the same plant, keeping the corresponding equipment unchanged, such as for example the assembling drums, bead core supports, etc. One of these carcasses is shown ill FIG. 2 just as an indication, and denoted "C".

Plant 1 comprises a plurality of assembling drums 2 which are guided along a given assembling path providing different stop positions for the drums, at which positions each drum according to a specific operating step of the assembling process undergoes the application of a particular component intended for the achievement of carcass "C".

In the particular embodiment shown, all stop positions are conveniently aligned along a common work axis coincident with the axis of the carcass being manufactured.

In a known manner, between the different components that are used for the purpose of obtaining tile assembled carcass "C", it is possible to identify main components that are common to all carcass types provided in the production range, and accessory components, each of which is specifically intended for a given type of carcass.

In the embodiment shown the main components comprise an air-impervious layer 4 of elastomeric sealing material commonly referred to as a "liner", designed to internally cover or line the finished tire, a main carcass ply 5 to be disposed over the elastomeric sealing layer 4, a pair of bead cores 6 provided with respective elastomeric fillers 6a to be engaged to the opposite ends of the carcass ply 5 and a pair of side walls 7 of elastomeric material to be disposed over tile carcass ply 5 at axially opposite positions.

The accessory components, in turn, may for example comprise an additional carcass ply 8 to be disposed over the main carcass ply 5 before the bead cores 6 are assembled and a pair of textile or metal reinforcing bands 9 to be disposed over the carcass ply or plies 5, 8 at laterally opposite positions, in the region of the folded portions of said plies, before the assembling of the side walls 7.

The main components 4, 5, 6, 7 and accessories 8, 9 are sequentially engaged in a known manner around the individual assembling drums 2 upon the action of respective primary work stations 10, 11, 12, 13 and auxiliary work stations 14, 15, operating at said drum stop positions.

In greater detail, at a first primary work station 10 the elastomeric air-impervious layer 4 is wrapped around the individual assembling drums 2.

Following the first primary station 10 there is a second primary work station 11 at which the main carcass ply 5 is wrapped around said drums, so as to overlie the air-impervious elastomeric layer 4.

Subsequently, the individual assembling drum 2 can be supplied from a first auxiliary assembling station 14, with the additional carcass ply 8 (see FIG. 1A) designed to be disposed so as to overlie the main carcass ply. Then, each assembling drum 2 may be supplied from a third primary work station 12, with the bead cores 6 that are engaged to the carcass ply or plies 5, 8 by folding back the opposite ends of said plies around the bead cores. Afterwards (see FIG. 1B the activation of the second auxiliary work station 15 may occur, this station being designed to apply the reinforcing bands 9, as well as of a fourth primary work station 13 on which the application of the side walls 7 relies.

In a novel manner, the auxiliary work stations 14, 15 are mounted on respective transverse slide guides 16, 17 and, upon command of known actuators (not shown), lend themselves to be individually displaced, preferably following a secondary path which is substantially perpendicular to the assembling path. The displacement of the individual auxiliary stations 14, 15 takes place between a rest position, in which said stations 14, 15 (as shown in FIG. 1) are moved away from the assembling path, in particular separated therefrom for possible interposition of primary stations 11, 12, and a work position in which they are located along the assembling path, being in alignment with the primary work stations 10, 11, 12, 13, and disposed operatively at one of said drum stop positions, in order to carry out the application of the corresponding accessory components 8, 9.

The possibility of moving the auxiliary work stations 14, 15 away from the assembling path, enabling them to be staggered relative to the primary work stations 10, 11, 12, 13, greatly facilitates the execution of all operations necessary for supplying said stations with the pieces of semifinished products to be assembled on the assembling drums 2, as well as the execution of possible servicing operations and operations tending to replace the supply turrets depending on the type of process to be carried out.

In addition, these supply, replacement and servicing operations are greatly facilitated as regards the primary work stations 10, 11, 12, 13 too, which are disposed adjacent the auxiliary stations 14, 15, by virtue of the free room created as a result of the auxiliary stations being moved to their rest position.

Preferably said auxiliary stations (14, 15) are located along the assembling path at the position made free by at least one of said primary work stations (11, 12), which is mounted in a novel manner on respective longitudinal slide guides 18 extending parallel to the assembling path and which have been previously moved away from its work position, parallel to the assembling path, by an amount not less than the width of the auxiliary work stations, in order to enable access of said stations to the respective work position, at the drum stop position.

According to a preferred aspect of the invention, each of the primary work stations 10, 11, 12, 13 is given this shifting possibility through said longitudinal slide guides 18: all stations can therefore be moved parallel to the assembling path, between one operating position and a second position which is displaced sideways with respect to said first position. In addition and preferably the translation amount is substantially equal to the positioning pitch of the drum stop positions. It is therefore advantageously possible to move the primary work stations 10, 11, 12, 13 close to and away from each other.

In this way when the auxiliary stations must be brought from the rest position they occupy to the operating position, the primary work stations can be moved parallel to the assembling path in order to enable access of the auxiliary stations to said path.

When for example, with reference to FIG. 1, the auxiliary station 14 needs to be used for application of the additional component 8, the primary station 11 adjacent the auxiliary station 14 is moved sideways close to or away from the primary station 10 over a length at least equal to the width of the auxiliary station 14 and preferably substantially corresponding to the positioning pitch of the drum stop positions, to enable the station 14 to gain access onto the assembling path.

Obviously the same as above also applies with reference to the primary work station 12 for the activation and deactivation of the second auxiliary work station 15.

It is of course possible, depending on the specific plant topography, to simultaneously move apart two adjacent primary stations in opposite directions in order to enable the auxiliary station lying alongside to enter the area thus opened up between said primary stations.

The mobility of the work stations parallel to the assembling path also enables two different stations to work alternately at the same drum stop position.

As a result, the plant of the invention lends itself to be adapted in a very quick and easy manner to the specific assembling process suitable for the different carcass types.

It will be also recognized that the possibility of moving the individual primary work stations 10, 11, 12, 13 apart from each other offers the advantage of further facilitating setting up and servicing operations to be carried out on said stations.

The assembled carcasses "C" in the manufacturing plant 1 must be then submitted at least to the application of a so-called "belt pack" and of a tread band before undergoing a vulcanization process for the purpose of obtaining a finished tire.

This additional step is carried out in an usual manner following working processes and using plants commonly known to those skilled in the art.

In particular, these plants may be directly connected to the plant of the invention such as to accomplish an independent operating sequence producing tires ready for vulcanization without interruption of the continuity from the semifinished product to the finished tire.

Alternatively, carcasses produced by the plant of the invention can be sent to storage from which they will be subsequently withdrawn for supply to a separate plant carrying out the completion of the tire through assembling of the belt pack 8 and tread band.

The tire thus completed is ready for undergoing the final vulcanization step; thus the invention attains important advantages.

From the above description it is in fact possible to assume that the possibility of moving the auxiliary work stations away from the assembling path and moving the individual primary stations 10, 11, 12, 13 close to and away from each other makes the setting up and servicing of the manufacturing plant in question very easy, and above all offers an excellent flexibility in use of the same.

In fact the auxiliary stations 14, 15 can be replaced whenever necessary in order to meet any specific types of process and supplied with the respective appropriate accessory components (additional plies 5, reinforcing bands 9 or others) in a very easy manner and without requiring the plant operation to be stopped, as they can be set in operation on the assembling path at any desired moment.

Each auxiliary station 14, 15 may also be advantageously provided with an electrofluidic control and drive unit managing the operation thereof and adapted to be connected with the electronic unit managing the operation of the whole plant 1 merely through electric and fluidic connectors to be activated at the moment that the corresponding auxiliary station is brought to the operating condition.

Advantageously, the auxiliary work stations can be also utilized in place of one or more of the primary work stations, in order to avoid tile operation of the plant being stopped during the setting and and/or servicing of the primary stations themselves.

The auxiliary work stations can in addition be conceived as removable and replaceable units in order to enable the setting up and/or servicing operations to be carried out at areas different from the ones where the plant is installed or for the purpose of serving a plurality of plants taking advantage of the different assembling processes simultaneously carried out on said plants.

Obviously many modifications and variations may be made to the invention as conceived without departing from the scope of the inventive idea characterizing it. For example also one or more of the primary stations may be conceived so as to be moved away from the assembling path, in the same manner as described with reference to the auxiliary stations.

We claim:

1. An automated plant for making tire carcasses for vehicle wheels, comprising:
   a plurality of assembling drums positioned for an advancing movement along an assembling path provided with a plurality of stop positions, each stop position having means for carrying out a specific operating step of a manufacturing process of said carcasses;

a plurality of primary work stations mounted on longitudinal guide means extending parallel to said assembling path, each station having means to apply, around each individual assembling drum, at said stop positions, a main tire component which is common to a plurality of carcass types included in a given production range, at least one of said primary work stations being a moveable station which is movable along said guide means away from its stop position to a second position along said assembly path;

at least one auxiliary work station having means to apply, around each individual assembling drum, one predetermined accessory tire component, intended for a specific one of said tire carcass types included in said production range, said at least one auxiliary work station being mounted on second guide means substantially transverse to said longitudinal guide means for movement between a rest position in which it is away from the assembling path, and a work position in which it is brought onto the assembling path and disposed in an operative condition at one of said drum stop positions from which said at least one moveable primary work station has been moved parallel to said assembling path, in order to carry out the application of said accessory component.

2. A plant according to claim 1 in which said at least one auxiliary work station is mounted to be movable in a direction substantially perpendicular to the assembling path.

3. A plant according to claim 1 in which said at least one auxiliary work station when in said work position in which it is located along the assembling path, is in alignment with the primary work stations, along a common work axis.

4. A plant according to claim 1 comprising:

one primary work station having means to apply an elastomeric sealing layer around individual assembling drums;

a second primary work station having means to apply one main carcass ply around said elastomeric sealing layer;

one auxiliary work station having means to optionally apply a semifinished additional piece around the main carcass ply;

a third primary work station having means to associate a pair of bead cores with the opposite edges of the carcass ply;

a second auxiliary work station having means to apply a further semifinished additional piece to said carcass ply; and a fourth primary work station having means to apply a pair of side walls of elastomeric material to said carcass ply, at laterally opposite positions on said carcass ply.

5. A plant according to claim 4 in which each of said primary work stations is movable parallel to the assembling path, between one operating position, at one stop position of said drums, and a second position in which it is moved away from the preceding position by substantially the same amount as the positioning pitch of said drum stop positions.

6. A plant according to claim 3 in which said common work axis is an axis of rotation of said assembling drums.

7. A plant according to claim 1 in which said assembling path is linear.

* * * * *